April 27, 1926.
W. E. INGHAM
1,582,821
SPEED REDUCING FACEPLATE FOR LATHES
Filed April 25, 1924 2 Sheets-Sheet 1
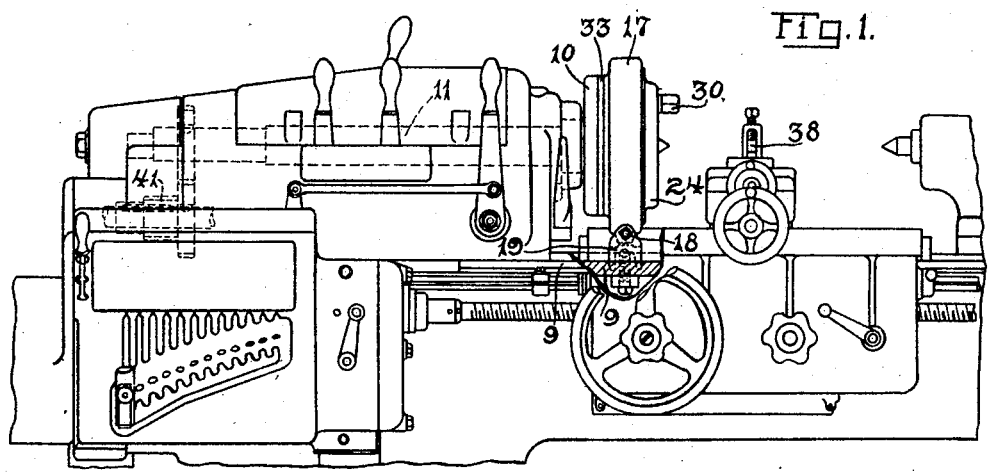
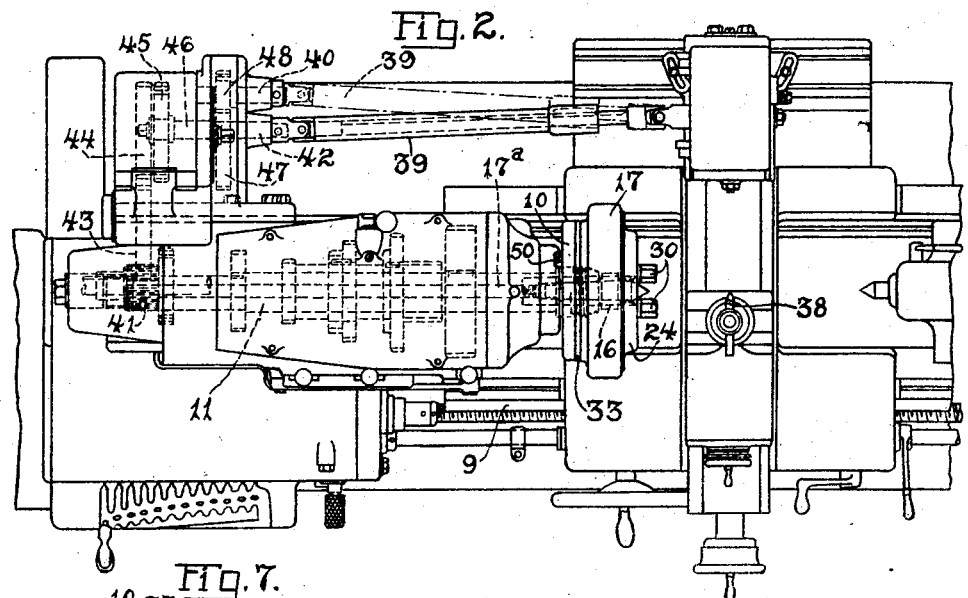
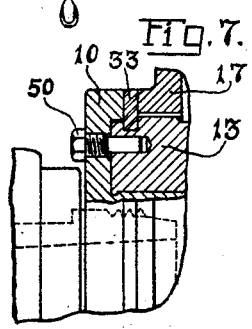
INVENTOR
W. E. Ingham
BY
Joseph K. Schofield
ATTORNEY

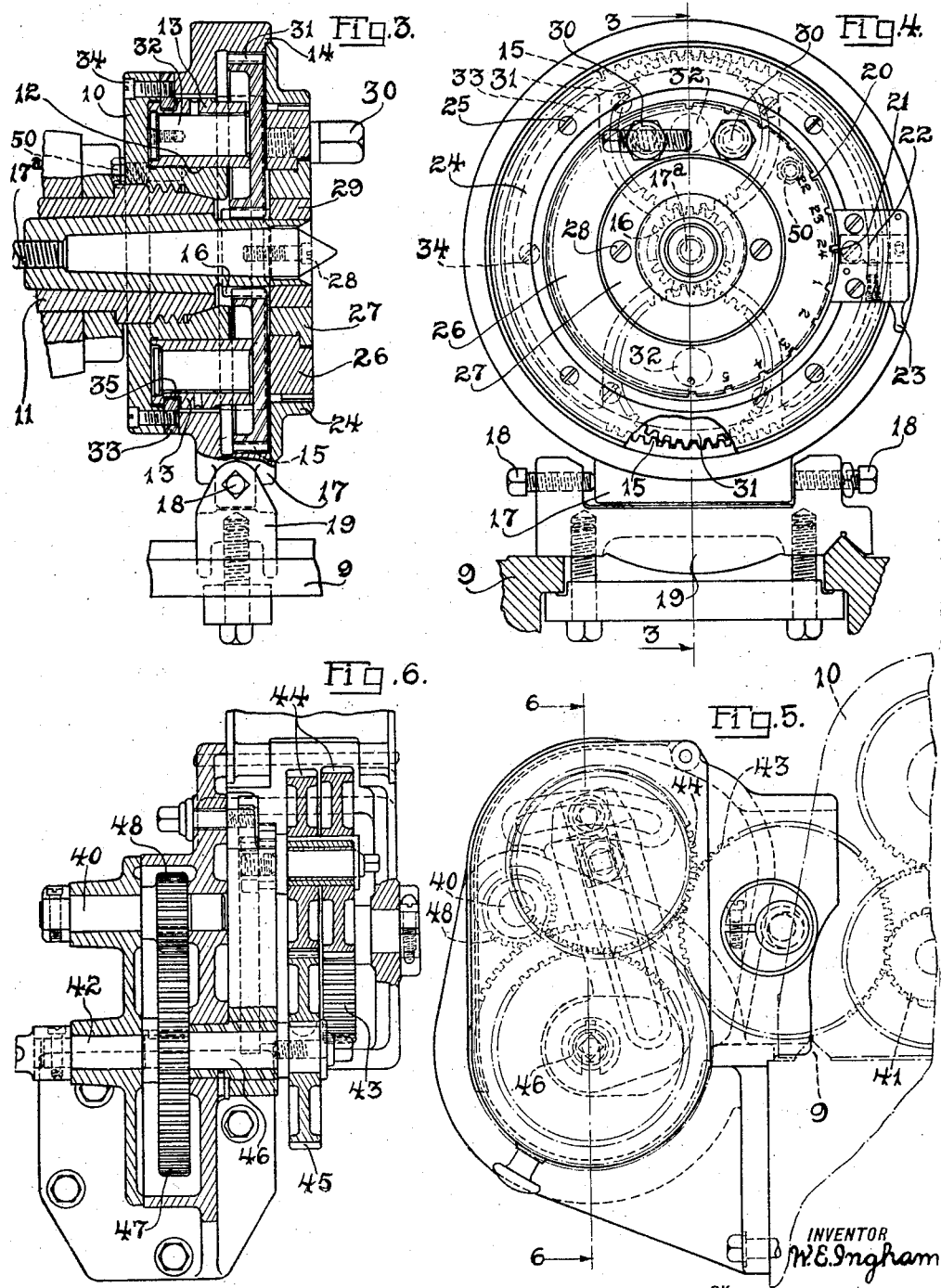

Patented Apr. 27, 1926.

1,582,821

UNITED STATES PATENT OFFICE.

WALTER E. INGHAM, OF NEWINGTON, CONNECTICUT, ASSIGNOR TO PRATT & WHITNEY COMPANY, OF NEW YORK, N. Y., A CORPORATION OF NEW JERSEY.

SPEED-REDUCING FACEPLATE FOR LATHES.

Application filed April 25, 1924. Serial No. 708,997.

*To all whom it may concern:*

Be it known that I, WALTER E. INGHAM, a citizen of the United States, residing at Newington, in the county of Hartford and State of Connecticut, have invented certain new and useful Improvements in Speed-Reducing Faceplates for Lathes, of which the following is a specification.

This invention relates to a speed reducing and indexing face plate adapted to be attached to the headstock spindle of a lathe.

An object of the present invention is to provide an improved form of face plate which may be rotated directly from the headstock spindle of a lathe, or other machine, and at a greatly reduced speed thereto.

Another object of the invention is to provide an attachment for a lathe in the form of a speed reducing face plate including indexing means thereon so that work may be held in a plurality of angularly different positions relative to the spindle.

One feature which enables me to accomplish the above named objects is that I provide a member, which may be termed a face plate member, and which may be mounted directly upon and rotated with the headstock spindle of a lathe. Another member, hereafter referred to as a driving member, is also provided which may be inserted within the headstock center recess and which has a pinion gear thereon, the work driving and speed reducing member being rotatably mounted on the face plate member and driven from this pinion through a simple system of planetary gearing. A third, or enclosing member, is held against rotation by being clamped to a fixed part of the lathe and has means cooperating with the driving member for rotating the work driving member.

Another feature which is advantageous is that the attachment may be applied to the headstock spindle of a lathe in the same manner as a face plate and so that its work driving element may be rotated at a greatly reduced speed compared to the speed of rotation of the spindle, but without effecting in any way the other mechanisms of the lathe.

Another object of the invention is to provide actuating means for a lathe tool operating at a speed correspondingly reduced with that of the face plate so that relieving operations may be carried out when the speed reducing face plate is being used.

It is a further object of the invention to provide a locking member on the device so that the members may be secured together and the device used as a face plate of usual form and capable of holding work in angularly indexed positions.

In carrying out operations upon work having helices of long lead either with or without relieved surfaces, it is difficult, if not impossible, in standard constructions to advance the tool longitudinally through the distances required during one revolution of the work. By reducing the speed of rotation of the work without similarly effecting the feeding mechanism for the tool, this may readily be done.

With the above and other objects in view, my invention consists in the features of construction and operation set forth in the following specification and illustrated in the accompanying drawings.

In the accompanying drawings annexed hereto and forming a part of this specification, I have shown my invention embodied in an attachment for an engine lathe, but it will be understood that the invention can be otherwise embodied and that the drawings are not to be construed as defining or limiting the scope of the invention, the claims appended to the specification being relied upon for that purpose.

In the drawings:

Figure 1 is a front elevation of a lathe having my invention applied thereto.

Fig. 2 is a plan view of the lathe shown in Fig. 1.

Fig. 3 is a vertical longitudinal sectional view of the speed reducing face plate taken upon line 3—3 of Fig. 4, and showing its attachment.

Fig. 4 is an outside view in elevation of the speed reducing face plate.

Fig. 5 is an end elevation of the mechanism for actuating a tool during relieving operations.

Fig. 6 is a sectional view taken substantially on line 6—6 of Fig. 5, and

Fig. 7 is a detail view of a locking device for the face plate member.

In the above mentioned drawings, I have shown but one embodiment of the invention which is now deemed preferable, but it is to be understood that changes and modifications may be made within the scope of the appended claims without departing from the spirit of the invention.

Briefly, and in its broadest aspect, my invention comprises the following principal parts: first, a body member applied directly to the headstock spindle of a lathe; second, a casing or enclosing member freely rotatable thereon and adapted to be held against rotation by attachment to a fixed part of the lathe; third, a member having a driving pinion thereon preferably inserted in the center recess of the headstock spindle; fourth, a work rotating member having a plate adjustable angularly thereon within the member held against rotation; fifth, gears on the work rotating member in mesh with the driving pinion and with teeth of an internal gear formed on the casing or enclosing member; and sixth, means operated from rotation of the spindle to actuate a lathe tool.

Referring more in detail to the figures of the drawings, I mount a body member 10 as shown clearly in Fig. 3, upon the end of the headstock spindle 11. Preferably, this member 10 is threaded upon the end of the lathe headstock spindle 11 and is rotated directly thereby. The member 10 is provided with a bearing portion 12 on which rotates a work driving or face plate member 13 which is adapted to be driven through intermediate gearing presently to be described. Surrounding the face plate member 13 and the member 10 is an enclosing or casing member 14 freely rotatable thereon and which is provided with an internal gear 15 formed integrally therein in the preferred embodiment of the invention. Within the center recess of the spindle 11 is a driving pinion 16 retained in its operative position by a rod 17ª threaded to it and extending through the spindle 11. With rotation, therefore, of the member 10 and the driving pinion 16, and with the casing member 14 retained against rotation, the work driving member 13 will be rotated at a speed greatly reduced from the spindle rotation.

In order to retain the casing member 14 from rotation during operation of the device, a lug 17 is formed on one side of the member 14 which may be clamped between opposed screws 18, or other means, mounted in a member 19 secured directly to the ways 9 of the lathe.

It is frequently desirable to use a face plate of this type as an indexing plate as well as a speed reducing driving member so that a plurality of grooves such as multiple screw threads or multiple worms may be conveniently and accurately formed. For this purpose, the work rotating member 13 of the face plate device is made of parts which may be held disposed in any angular relation to each other and, for convenience a plurality of equally spaced notches 20 are provided on one of these members which may be engaged by a tooth 21 mounted on the other member. As shown in Fig. 4, this locking tooth 21 is mounted on a plunger 22 which may be moved into or out of engagement with the slots 21 by oscillation of a small lever 23.

A retaining ring 24 is attached by screws 25 directly to the driving member 13 and is adapted to rotate with this member within the enclosing member 14. It is on this ring 24 that the plunger 22 is mounted. Within this ring 24 is the angularly adjustable member 26 provided with the above mentioned spaced notches 20. This member 26 is retained in position by means of a bushing 27 held to the member 13 by screws 28. The bushing 27 rotates with the member 13 upon a ring 29 forced onto the pinion carrying member 16.

By means of projections 30 extending from the face of the member 26, work may be driven the same as by the conventional form of face plate. Also, as the member 26 may be angularly disposed, relative to the member 13 and ring 24, the work may be angularly adjusted or indexed through precisely predetermined angles by means of the locking pin 21 and the notches 20.

To effect the driving relation between the driving pinion 16 and the member 13, gears 31 are mounted on the member 13 which are in mesh with the pinion 16 and with the teeth of the internal gear 15 on the enclosing member 14. As shown in Figs. 3 and 4, two of these gears 31 are provided each having shank portions 32 which are suitably retained within and rotate within the member 13. As the number of teeth in the pinion 16 is small compared with the number in the internal gear 15, the rotation of the member 13 which carries gears 31 will be reduced relative to that of the spindle 11. Simultaneously with the rotation of the gears 31 bodily about the axis of the spindle 11, they rotate freely upon their own axes. To retain the member 13 and its attached parts in position upon the member 10, a ring 33 preferably made in two pieces is provided. This is attached by screws 34 to a flange portion of member 10 and enters an annular groove 35 in the member 13, permitting the member 13 to rotate relative to the member 10.

In carrying out turning operations upon large work in a lathe of medium size, it is very desirable that the work be rotated at extremely slow speed, usually the lowest speed for which the lathe is adapted. The above described mechanism may therefore be used to advantage when such operations are to be carried out. Also, frequently, it is desirable to form relieved surfaces on such work and therefore use may be made of a relieving attachment such as shown and described in the patent to Hanson 714,894. It will be understood that the relieving tool must be actuated at a greatly reduced speed when the work is rotated by the speed reducing face plate 13. I therefore provide such speed reducing mechanism for the tool 38 to be used during relieving operations which is designed to reduce the speed of the tool reciprocations in the same ratio that the speed of the work is reduced by the face plate member 13.

As shown in Figs. 2, 5 and 6, the lathe tool 38 may be given its relieving movements through suitable mechanism driven through the telescoping shaft 39 shown clearly in Fig. 2. This telescoping shaft 39 normally, when the work is rotated directly with the headstock spindle 11, is rotated from a short shaft 40 having a pinion gear 48 thereon, this gear 48 being driven through a transmission mechanism directly from a gear 41 on the end of the headstock spindle 11. For effecting the relieving movements of the tool 38 when the speed reducing face plate 13 is in use, I attach the telescoping shaft 39 to a shaft 42 carrying an intermediate gear 47 of this transmission mechanism, the speed of which is reduced in the correct ratio.

Referring to Figs. 5 and 6, it will be seen that there is an intermediate gear 43 in contact with the pinion 41 on the end of the work spindle 11. This intermediate gear 43 is in contact with one of a pair of gears 44 adapted to be rotated together. The other gear 44 of this pair rotates a gear 45 on the shaft 42 carrying the driving gear 47 for the pinion 48 mounted on the short shaft 40. Each of these shafts 40 and 42 is adapted to have connected to it in driving relation by the means shown, the telescoping shaft 39 by which the tool 38 is reciprocated. In the normal operation of the lathe when the speed reducing face plate 13 is not in use, the telescoping shaft 39 is attached to the shaft carrying the pinion 48 as shown in dotted lines in Fig. 2. With the face plate reducing member 13 in operation, the telescoping shaft 39 is attached to the short shaft 42 on which is mounted the driving gear 47 for the pinion 48. This is shown in full lines in Fig. 2.

The device may also be utilized as an indexing face plate without the speed reducing feature. For this purpose, I provide a lock acting to bind the members 10 and 13 together. This is in the form of a tapered pin 50, preferably having a threaded portion thereon. The pin 50 enters recesses provided for it in members 10 and 13 so that with this pin in place all relative rotation between these parts is prevented and they are constrained to rotate together. With the pin 50 in position, the clamping member 19 is removed.

What I claim is:

1. A speed reducing face plate for lathes comprising in combination, a member adapted to be mounted on and rotate with the headstock spindle, a work driving member rotatably mounted thereon, a member fixed against rotation, said three members being held in associated relationship, a driving gear on said headstock spindle, intermediate gears on said work driving member, and a gear on said member fixed against rotation.

2. A speed reducing face plate for lathes comprising in combination, a member adapted to be mounted on and rotate with the headstock spindle, a work driving member rotatably mounted thereon, a member fixed against rotation and enclosing said work driving member, a driving gear rotated by said spindle, an internal gear on said enclosing member, and a gear on said work driving member meshing with said driving and internal gears whereby rotation of said driving gear will rotate said work driving member at a reduced speed relative to said spindle.

3. A speed reducing face plate for lathes comprising in combination, a member adapted to be mounted on and rotate with the headstock spindle, a work driving member rotatably mounted thereon, a member fixed against rotation and enclosing said work driving member, a driving gear rotated by said spindle, an internal gear on said enclosing member, and a pair of freely rotatable gears on said work driving member meshing with said driving and internal gears whereby rotation of said driving gear will rotate said work driving member at a reduced speed relative to said spindle.

4. A speed reducing face plate for lathes comprising in combination, a member adapted to be mounted on and rotate with the headstock spindle, a work driving member rotatably mounted thereon, a member rotatably mounted relative to the above mentioned members, a clamp fixed to the ways of the lathe to normally retain said last mentioned member against rotation, said three members being held in associated relationship, a driving gear rotated by said headstock spindle, a gear on said work driving member in mesh therewith, and a gear on said member normally retained against rotation whereby rotation of said driving gear will rotate said work driving member at a lower speed than said spindle.

5. A speed reducing face plate for lathes comprising in combination, a member adapted to be mounted on and rotate with the headstock spindle, a work driving member rotatably mounted thereon, a member normally fixed against rotation, said members being held in associated relationship, a driving gear rotated by said headstock spindle, geared means to rotate said work driving member therefrom, and locking means whereby all of said members may be constrained to rotate simultaneously together.

6. A speed reducing face plate for lathes comprising in combination, a member adapted to be mounted on and rotate with the headstock spindle, a work driving member rotatably mounted thereon, a member rotatably mounted relative to the above mentioned members, means to normally retain said last mentioned member against rotation, said three members being held in associated relationship, a driving gear rotated by said headstock spindle, a gear on said work driving member in mesh therewith, a gear on said member normally retained against rotation whereby rotation of said driving gear will rotate said work driving member at a lower speed than said spindle, and means adapted to constrain said members to rotate together.

7. A speed reducing face plate for lathes comprising in combination, a member adapted to be mounted on and rotate with the headstock spindle, a work driving member rotatably mounted thereon, a member normally fixed against rotation, said members being held in associated relationship, a driving gear rotated by said headstock spindle, geared means to rotate said work driving member therefrom, and locking means passing through said first mentioned member and said driving member whereby all of said members may be constrained to rotate simultaneously together.

8. A speed reducing face plate for lathes comprising in combination, a member adapted to be mounted on and rotate with the headstock spindle, a work driving member rotatably mounted thereon, an angularly adjustable plate on said work driving member, a member fixed against rotation, said members being held in associated relationship, a driving gear rotated by said headstock spindle, and geared means to rotate said work driving member therefrom.

9. A speed reducing face plate for lathes comprising in combination, a member adapted to be mounted on and rotate with the headstock spindle, a work driving member rotatably mounted thereon, an angularly adjustable plate on said work driving member, means to hold said plate in predetermined angular relation to said work driving member, a member fixed against rotation, said members being held in associated relationship, a driving gear rotated by said headstock spindle, and geared means to rotate said work driving member therefrom.

10. A speed reducing face plate for lathes comprising in combination, a member adapted to be mounted on and rotate with the headstock spindle, a work driving member rotatably mounted thereon, an angularly adjustable plate on said work driving member, a member fixed against rotation, said members being held in associated relationship, a driving gear rotated by said headstock spindle, geared means to rotate said work driving member therefrom, and means to lock said work driving member to said first mentioned means whereby it may rotate therewith.

11. A speed reducing face plate for lathes comprising in combination, a member adapted to be mounted on and rotate with the headstock spindle, a work driving member rotatably mounted thereon, means to rotate said driving member at a reduced speed relative to the spindle, means operated by the spindle rotation to actuate a tool toward and from the work, and two driving connections for said tool operating means operating at different speeds whereby said actuating means may be used with or without the speed reducing work driving means.

12. A speed reducing face plate for lathes comprising in combination, a member adapted to be mounted on and rotate with the headstock spindle, a work driving member rotatably mounted thereon, means to rotate said work driving member at a reduced speed relative to said spindle, and optionally usable means to actuate a tool toward and from the work in timed relation to the spindle or to the work driving member.

In testimony whereof, I hereto affix my signature.

WALTER E. INGHAM.